(12) United States Patent
Gluck

(10) Patent No.: US 9,882,625 B2
(45) Date of Patent: Jan. 30, 2018

(54) PASSIVE REPEATER FOR FORWARDING RADIO SIGNALS FROM INTERIOR TO EXTERIOR OF A HOUSING INCLUDING INSERTABLE ANTENNA

(71) Applicant: Schaeffler Technologies AG & Co. KG, Herzogenaurach (DE)

(72) Inventor: Stefan Gluck, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/125,335

(22) PCT Filed: Mar. 4, 2015

(86) PCT No.: PCT/DE2015/200120
§ 371 (c)(1),
(2) Date: Sep. 12, 2016

(87) PCT Pub. No.: WO2015/135542
PCT Pub. Date: Sep. 17, 2015

(65) Prior Publication Data
US 2017/0099094 A1  Apr. 6, 2017

(30) Foreign Application Priority Data
Mar. 12, 2014 (DE) .................. 10 2014 204 495

(51) Int. Cl.
*H04B 7/145* (2006.01)
*H04B 1/3822* (2015.01)

(52) U.S. Cl.
CPC ........... *H04B 7/145* (2013.01); *H04B 1/3822* (2013.01)

(58) Field of Classification Search
CPC ... H04B 7/145; H04Q 2209/47; H04W 16/26; H04W 88/04; H04W 88/06;
(Continued)

(56) References Cited

U.S. PATENT DOCUMENTS 5,742,259 A * 4/1998 Annamaa ............... H01Q 1/362
                                                                29/600
6,326,925 B1 * 12/2001 Perkio ................... H01Q 1/088
                                                                343/702
(Continued)

FOREIGN PATENT DOCUMENTS

EP            2720313         4/2014
JP            H0474025        3/1992

*Primary Examiner* — Philip Sobutka
(74) *Attorney, Agent, or Firm* — Volpe and Koenig, P.C.

(57) ABSTRACT

The invention relates to a passive repeater for forwarding radio signals from a first device having a radio interface to a second device having a radio interface, wherein the passive repeater is configured to forward radio signals between an interior of a housing, which has a housing wall acting as a radio barrier, and an exterior, through the housing wall, wherein the passive repeater has a first antenna and a second antenna for this purpose, which are connected to each other by a passive and galvanic coupling, and wherein the first antenna can be arranged in the interior and the second antenna can be arranged in the exterior, and the passive coupling can be carried out through an opening in the housing wall, and wherein the first antenna can be inserted into the interior from the exterior through the opening and/or the second antenna can be withdrawn from the interior to the exterior through the opening. The invention further relates to a radio system having such a passive repeater, to a vehicle having such a repeater or such a radio system, to a bearing having such a repeater or such a radio system, and to a use of such a repeater or such a radio system.

11 Claims, 1 Drawing Sheet

(58) Field of Classification Search
CPC ...... H01Q 1/3291; H01Q 1/32; H01Q 1/1214;
H01Q 1/3208; H01Q 1/325; H01Q 1/103
USPC ...................................................... 455/7–25
See application file for complete search history.

(56) References Cited

U.S. PATENT DOCUMENTS

| | | | |
|---|---|---|---|
| 7,629,943 | B2 | 12/2009 | Tuttle |
| 8,462,062 | B2 | 6/2013 | Westrick et al. |
| 2002/0028655 | A1 | 3/2002 | Rosener et al. |
| 2003/0214774 | A1 | 11/2003 | Locatelli et al. |
| 2007/0205946 | A1 | 9/2007 | Buris et al. |
| 2007/0262868 | A1 | 11/2007 | Westrick et al. |
| 2010/0103071 | A1* | 4/2010 | Farrell ................. H01O 1/2225 343/853 |
| 2013/0016028 | A1* | 1/2013 | Joo ......................... H01Q 9/30 343/883 |
| 2014/0346887 | A1* | 11/2014 | Bhamidipati .......... H04B 5/005 307/104 |

* cited by examiner

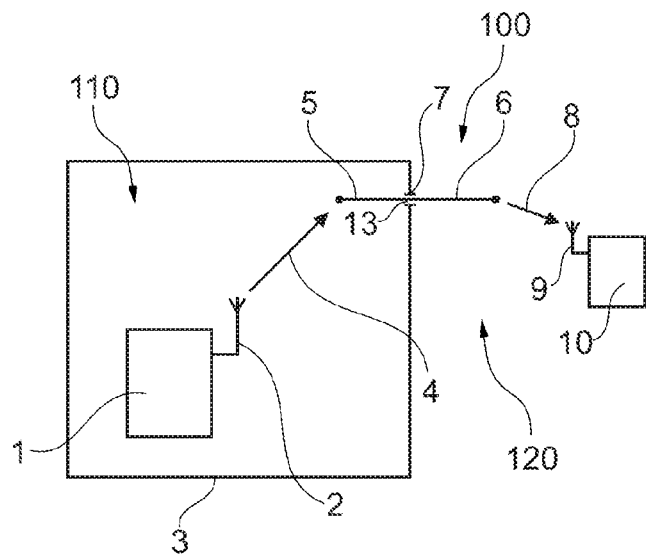
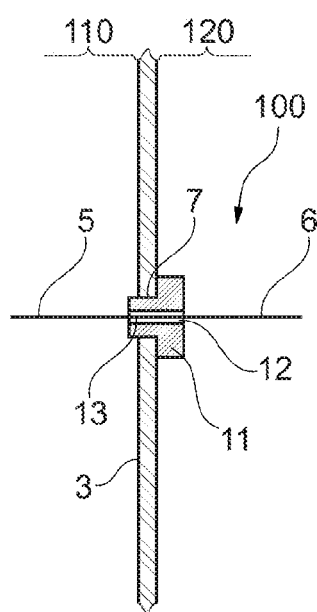
Fig. 1
Fig. 2
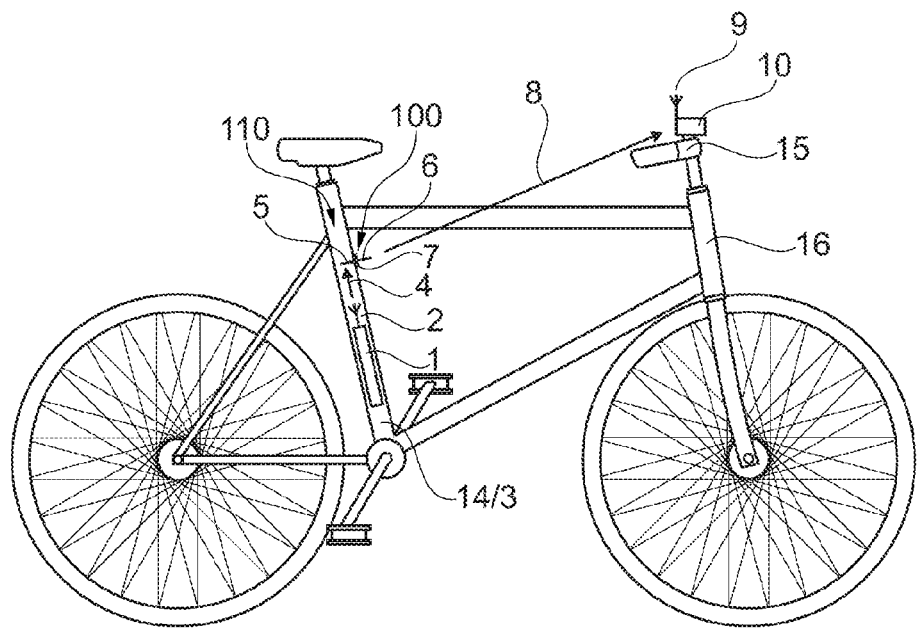
Fig. 3

PASSIVE REPEATER FOR FORWARDING RADIO SIGNALS FROM INTERIOR TO EXTERIOR OF A HOUSING INCLUDING INSERTABLE ANTENNA

FIELD OF THE INVENTION

The invention relates to a passive repeater for forwarding radio signals from a first device with radio interface to a second device with radio interface from an interior to an exterior separated by a radio barrier. The invention further relates to a radio system with such a passive repeater, a vehicle with such a repeater or such a radio system, a bearing with such a repeater or such a radio system, and a use of such a repeater or such a radio system.

BACKGROUND

From the prior art it is known to overcome radio barriers in such a way that an antenna of the first device is extended by a cable extension so that it can be arranged on the other side of the radio barrier (e.g., a shielding housing). Furthermore, active Bluetooth or WLAN repeaters, sometimes also with intermediate networks, are also known that are not suitable for many applications, however, due to the installation space, the costs, and the necessary power supply.

U.S. Pat. No. 8,462,062 B2 shows a passive wireless repeater that is mounted on the side wall of a container. The repeater includes a first antenna on one side of the side wall, a second antenna on an opposite side of the side wall, and an electrical connection between the first antenna and the second antenna.

From the published EP 2 720 313 A1, a device is known for forwarding radio signals through a metal wall. Similar devices are to be found in U.S. Pat. No. 7,629,943 B2, US 2003/0214774 A1, and JP H04-74 025 A.

SUMMARY

The invention is based on the objective of providing a simple and economical option that is independent of a power supply and has low attenuation and/or distortion for forwarding radio signals, wherein this option is also easy to install or retrofit.

This objective is achieved according to the invention, in particular, by a passive repeater for forwarding radio signals from a first device with a radio interface to a second device with a radio interface, wherein the passive repeater is designed to forward the radio signals between an interior of a housing that has a housing wall acting as a radio barrier and an exterior through the housing wall, wherein the passive repeater has, for this purpose, a first antenna and a second antenna that are preferably connected to each other by a passive and galvanic coupling, and wherein the first antenna can be arranged in the interior and the second antenna can be arranged in the exterior and the passive coupling can be led through an opening of the housing wall and wherein the first antenna can be introduced from the exterior through the opening into the interior and/or the second antenna can be guided from the interior through the opening to the exterior, wherein one or both of the antennas have an elastic material and components of the one or both of the antennas can be pressed together elastically.

The objective is further achieved according to the invention, in particular, by the specified subordinate claims and secondary claims.

This arrangement makes it possible to install the passive repeater from only one side, which is especially advantageous, e.g., if the housing cannot be opened or only inadequately for the installation of the repeater, wherein here, in particular, the first antenna can then be inserted from the exterior through the opening into the interior. This is also associated with simple capability for retrofitting in an existing housing, e.g., bicycle frame. Furthermore, a simple, economical, and passive option for forwarding radio signals is provided. On one hand, continuous wiring from the first device with a radio interface past the radio barrier is not required. Furthermore, standard radio modules (i.e., devices with radio interfaces) can be used that already have integrated antennas in the normal case and thus, in practice, separate an extension of the antenna by a cable. Through the passive coupling, the passive repeater enables, independent of a power supply and the galvanic coupling, in contrast, e.g., to an inductive coupling, also an overcoming of an electrically conductive, in particular, metallic housing wall, wherein the attenuation and distortion can be further kept to a minimum.

The following function is thus provided by the passive repeater: if the first device with a radio interface transmits, the first antenna receives these radio signals in the interior, converts them into electrical signals that are transmitted via the passive and galvanic coupling through the housing wall to the second antenna and are radiated from the second antenna in the exterior to the second device with radio interface. Preferably, this functionality is also provided in the opposite direction: if the second device in the exterior transmits, the function is preferably useful but now the second antenna receives while the first antenna radiates the signal to the first device in the interior.

A passive repeater is understood to be a device that receives a radio signal via a first antenna and resends this signal via a second antenna, wherein no external electrical power supply is required.

A device with a radio interface is preferably any electronic device that can send and/or receive signals by radio. It is, e.g., a radio module for one or more of the following radio signal types: Bluetooth, WLAN, ZigBee, DECT, short wave, VHF, GSM, ANT, ANT+. Here, the device with radio interface is especially preferred a Bluetooth device or device for ANT+. Such a device can be used universally for a wide range of purposes and is compatible with many devices already owned by consumers. Especially preferred, the device with a radio interface and the radio interface are arranged on the same circuit board. The radio interface preferably has an antenna that is connected galvanically, e.g., via a circuit board track conductor, and wirelessly, i.e., without an intermediate cable, to the device with radio interface.

A radio barrier is preferably a body that prevents radio signals from being able to be transmitted through it or that at least attenuates the radio signals. It is preferably an electrically conductive, preferably shielding, housing wall or a part of such a housing wall. Usually the radio barrier and/or the housing wall has or is made from a preferably flat or mesh-like, metallic, or good electrically conductive material.

The first and second antenna are any type of antenna known from the prior art (e.g., rod, patch, directional, slot, quad, or Yagi antenna, etc.). Preferably, the first and second antenna are of the same type and preferably they also have identical dimensions. Preferably, the dimensions are adapted to the radio signals being used. For example, both antennas are adapted with their electrical length to the frequency range being used and are, e.g., one quarter of the wavelength long. For example, the length of one antenna is approx. 31 mm for the Bluetooth range.

The passive and galvanic coupling or passive-galvanic coupling is preferably adjusted according to the root point impedance of the antennas so that interfering reflections and thus losses can be minimized.

The opening of the housing wall is preferably a hole.

Preferably, at least one antenna projects on one side of the opening (i.e., the side of the opening facing the corresponding space, interior or exterior) into the corresponding space. Preferably, both antennas project on their corresponding side of the opening into the corresponding space, i.e., the first antenna into the interior, the second antenna into the exterior. Preferably, one antenna is, preferably both antennas are perpendicular to the housing wall.

The first and/or second antenna can be preferably guided with the antenna tip or the area of the antenna that is opposite the root point into the opening and through the opening into the space behind the opening (interior or exterior). Preferably, the first and/or second antenna has a preferably sheathed, curved (e.g., corkscrew-shaped) or rod-shaped wire or a preferably sheathed strand with a diameter less than the diameter of the inscribed circle of the opening. A curved (sheathed) wire can be inserted, e.g., by means of a turning and/or tilting motion, into the opening from one space into the other space.

The housing is preferably a bearing housing or a vehicle component (e.g., a chassis component or a bicycle frame tube).

Preferably the housing wall is an electrically conductive housing wall and the passive-galvanic coupling and the antennas are electrically insulated from the housing wall. In this way, even especially very well shielded housings like those with an electrically conductive housing can be bridged by the passive repeater.

In the passive repeater, one or both of the antennas have an elastic material or are preferably formed from this elastic material and components of the one or two antennas can be pressed together elastically.

In this way, the antennas can be pressed to the opening dimension and guided through the opening. When they reach the destination space, the antennas unfold again. In this way, antennas with larger dimensions in the unfolded state can be guided through the opening into the other space, e.g., this can be easily performed for a quad antenna. An elastic material is, e.g., a steel (e.g., steel sheet or steel spring) or an elastic, preferably electrically conductive plastic, or preferably a plastic coated with a conductive layer or a coated and/or electrically conductive shape memory material (e.g., a shape memory alloy or a shape memory polymer).

In another passive repeater according to the invention, the antennas and the passive and galvanic coupling are made from a common, continuous electrically conductive component (e.g., conductive plastic or plastic coated with conductive layer, metal piece, in particular, wire), or a common, continuous strand.

In this way, a decisive manufacturing advantage can be achieved for the passive repeater. Both antennas can thus be produced and formed by only one component.

In another passive repeater according to the invention, the passive repeater has a holder for the arrangement of both antennas on the holder.

In this way, the structural complexity of the passive repeater can be reduced significantly, which produces advantageous effects on the costs and simpler installation capability.

The antennas can be arranged or are arranged preferably on at least one of their ends or end areas, in particular, the root point, on the holder. The passive-galvanic coupling is preferably embedded in the holder.

The holder can also be made from multiple components that can then be assembled to form a holder. In an especially preferred way, however, it consists of a single component. It is preferably formed as a sleeve. The holder preferably consists of an electrically insulating material or the passive-galvanic coupling and the antennas are electrically insulated from the holder by electrical insulation or different electrical insulating devices. Electrical insulation is, e.g., a material/substance (e.g., plastic or air) with a resistance of greater than 1 kOhm, preferably 1 MOhm, especially preferred infinite ohms. The holder preferably has one or more sealing surfaces by which the opening can be sealed or is sealed. This arrangement provides protection from soiling of the interior.

Preferably, the holder can be initially mounted on the housing without any or with only a single antenna arranged on the holder. The other antenna or, if not even one antenna is mounted on the holder, both antennas are then arranged on the holder. In an especially preferred way, however, both antennas are already arranged on the holder before the mounting of the passive repeater on the housing.

In another passive repeater according to the invention, both antennas are preassembled on the holder.

This arrangement makes assembly easier.

In another passive repeater according to the invention, the holder can be inserted into the opening from one direction, that is, either from the interior or from the exterior.

This arrangement enables an option for mounting the holder from only one side. In an especially preferred way, it is combined with the feature of insertability of an antenna from a space (exterior or interior) through the opening into the other space. Then the entire passive repeater, preferably with antennas already preassembled on the holder, can be mounted from only one side of the housing.

The holder preferably has an area that is smaller in cross section than the opening and thus can be inserted into it. Preferably, it also has a different area that is greater in cross section than the opening, so that the holder cannot slide through the opening.

In another passive repeater according to the invention, the holder can be held, preferably is held, in a self-fixing manner in the opening.

Here, separate fasteners are not required, which, on one hand, lowers the costs and, on the other hand, simplifies the assembly.

The holder preferably has an external thread that can be screwed in an internal thread of the opening or is screwed in the use case. For example, the holder is a screw with or without a screw head. The internal thread of the opening can be, e.g., an internal thread of a sleeve that is engaged or pressed in the opening and is made from an insulating material, wherein then the screw is preferably electrically conductive and the passive-galvanic coupling and the holder are realized in the form of a screw in a component. In an especially preferred way, the internal thread is a thread cut into the material of the housing wall and the passive-galvanic coupling is insulated by the housing wall, e.g., the screw is made from an insulating material or has an insulating coating and/or the passive-galvanic coupling is embedded in an insulating material within a possibly electrically conductive screw.

Alternatively, the holder has a latch mechanism. This has, e.g., snap hooks that can be guided or are guided through the opening and can be engaged or are engaged at the end of the opening on the housing wall.

In another passive repeater according to the invention, the holder has a preferably central, preferably continuous holder opening and the passive and galvanic coupling runs through the holder opening.

This arrangement provides a simple passing of the passive-galvanic coupling through the holder or embedding of the passive-galvanic coupling in the holder.

Preferably, the holder opening runs parallel to the opening of the housing wall in the state of the holder mounted on the housing. Preferably, there is exactly one holder opening, which minimizes entry of contaminating particles or increases the sealing properties. The holder opening is preferably a hole. For example, the holder opening is an axial hole through the center axis of a screw or the opening of a holder formed as a sleeve. Preferably, the antennas can be or are inserted or screwed into the holder opening, preferably each from one side.

In an especially preferred way, it is combined with two antennas and a passive-galvanic coupling that are made from a common, continuous, electrically conductive component or a common, continuous strand. This component or the strand can be or is inserted or screwed through the holder opening. Preferably, an area of the component projects from one side out of the holder and the holder opening, preferably two areas of the component on both sides project out from the holder and holder opening.

Furthermore, the objective is achieved according to the invention, in particular, by a radio system with a first device with radio interface and/or a second device with radio interface, wherein the radio system has a previously described passive repeater for forwarding radio signals from the first device with radio interface to the second device with radio interface.

Furthermore, the objective is achieved according to the invention, in particular, by a vehicle, in particular, a bicycle, wherein the vehicle has a previously described passive repeater for forwarding radio signals from the first device with radio interface to the second device with radio interface or a previously described radio system, wherein the housing is a vehicle component and the first antenna is arranged in an interior of the vehicle component and the second antenna is arranged in the exterior and the passive and galvanic coupling is guided through an opening of a preferably electrically conductive vehicle component wall.

In this way, the advantages of the passive repeater specified above for forwarding radio signals is used in an especially preferred way.

Preferably, the passive-galvanic coupling and the antennas are electrically insulated from the electrically conductive vehicle component wall.

The vehicle component is, e.g., a housing-like component that cannot be opened easily or only inadequately. For example, this is a tube of a bicycle frame. In such a tube, openings are often already present that are thus very well suited, even for retrofitting, for the mounting of the passive repeater for forwarding radio signals. Preferably, the bicycle frame has an opening for passing cables or for fastening a drinking water bottle holder and the passive repeater is arranged in this opening. Thus, radio modules that are installed in the tube can be controlled and/or read by radio signals from the outside despite the shielding effect of the tube. Preferably the second device with radio interface is arranged on the handlebar of the bicycle.

In another vehicle according to the invention, the vehicle is a bicycle, in particular, an electrically driven bicycle (e.g., pedelec), the vehicle component is a frame tube of the bicycle, and the opening of the vehicle component wall is an opening in a wall of the frame tube and the first device with radio interface is arranged in the frame tube of the bicycle and the passive repeater is mounted in the opening.

In this way, a bicycle is provided in which the installation space within a frame tube can be used for electrical modules that can respond by means of radio without the cost and complication of wiring. In particular, for a bicycle frame that is difficult or even impossible to access from its inside, at least after the assembly of the bicycle frame, the passive repeater according to the invention, which can be installed from the outside into the opening of a frame tube and thus can also be retrofitted primarily on existing bicycles, shows its advantages.

In another vehicle according to the invention, the frame tube is the seat tube of the bicycle and the opening in which the passive repeater is mounted is in the upper half, preferably in the upper quarter of the seat tube and/or directed forward toward the handlebars of the bicycle.

Preferably, the first device with radio interface is in the lower half, preferably in the lower quarter of the seat tube. Preferably, the second device with radio interface is on the handlebar of the bicycle.

An antenna of the passive repeater can be directed forward through an opening that is directed forward, wherein, on one hand, the quality of the radio connection to a second device with radio interface arranged primarily on the handlebar is improved and also the antenna can be oriented so that it does not project or not significantly past the width of the bicycle frame tube perpendicular to the direction of travel and thus is safer from unintentional destruction. Through an opening in the upper half or in the upper quarter, the quality of the radio connection to a second device with radio interface arranged primarily on the handlebar is improved, because the radio path in the exterior is shorter and for the arrangement of the first device with radio interface in the lower half or in the lower quarter of the seat tube, a longer path of the overall radio path runs through the interior in the tube better shielded from interfering signals.

In another vehicle according to the invention, the first device with radio interface is a switch actuator or a control unit for an electrical bicycle drive motor.

Here, a switch actuator or an ECU for an electrical bicycle drive motor is advantageously arranged in the bicycle frame without the cost or complication of wiring for transmitting signals.

Furthermore, the objective is achieved according to the invention, in particular, by a bearing, wherein the bearing has a previously described passive repeater or a previously described radio system, wherein the housing is a bearing housing and the first antenna is arranged in an interior of the bearing housing and the second antenna is arranged in the exterior and the passive and galvanic coupling is passed through an opening of a bearing housing wall.

Here, the sensors and actuators within a bearing housing, which is typically made from metal and is therefore impenetrable for radio signals, are accessible by means of radio signals. A bearing is understood, according to the invention, to be a machine element for guiding components that move relative to each other.

Furthermore, the objective is achieved according to the invention, in particular, by a use of a previously described passive repeater for forwarding radio signals from the first device with radio interface to the second device with radio interface, wherein the first antenna is arranged in the interior and the second antenna is arranged in the exterior and the passive and galvanic coupling is passed through an opening of the preferably electrically conductive housing wall.

Preferably, a passive repeater for forwarding radio signals is used accordingly as a component of a previously described radio system. Preferably, the passive-galvanic coupling and the antennas are electrically insulated from the electrically conductive housing wall.

BRIEF DESCRIPTION OF THE DRAWINGS

Shown as examples for possible embodiments of the invention are

FIG. 1 a passive repeater according to the invention for forwarding radio signals and their use in a housing, FIG. 2 a passive repeater according to the invention based on the passive repeater from FIG. 1, wherein the passive repeater has a holder, and FIG. 3 a bicycle with a passive repeater according to the invention based on the passive repeater from FIG. 2.

DETAILED DESCRIPTION OF THE PREFERRED EMBODIMENTS

FIG. 1 shows a passive repeater 100 according to the invention for forwarding radio signals and their use in a housing. The first device 1 with radio interface, here indicated by an antenna 2, is located in the housing 3 that forms an interior 110. The second device 10 with radio interface, indicated by an antenna 9, is arranged outside of the housing 3, i.e., in the exterior 120. The passive repeater 100 for forwarding radio signals has a first antenna 5 that is arranged in the interior 110 and a second antenna 6 that is arranged in the exterior 120. They are connected to each other by a passive-galvanic coupling 13 that is passed through an opening 7 of the housing wall. The first antenna 5 can be inserted from the exterior 120 through the opening 7 into the interior 110 and the second antenna 6 can be guided from the interior 110 through the opening 7 to the exterior 120.

During operation of the invention, the passive repeater 100 forms an interface for the radio path 4 between the antennas 2 and 5 in the interior 110 and the radio path 8 in the exterior between the antennas 6 and 9. The repeater can be easily installed in advance on the housing from only one side.

In this way, a strongly attenuating or even completely shielding housing 3 for radio waves can be bridged and the two devices 1, 10 can communicate with each other by radio, without additional cables having to be laid. Furthermore, housings can be retrofitted flexibly with the passive repeater. A radio system according to the invention is formed of, e.g., from the two devices 1, 10 and the passive repeater 100.

FIG. 2 shows a passive repeater according to the invention based on the passive repeater from FIG. 1, wherein the passive repeater has a holder 11. The housing wall is here an electrically conductive housing wall and the passive-galvanic coupling 13 and the antennas 5, 6 are electrically insulated from the housing wall. The first antenna 5 can be inserted from the exterior 120 through the opening 7 into the interior 110 and the second antenna 6 can be guided from the interior 110 through the opening 7 to the exterior 120. For mounting this shown passive repeater 100 on the housing 3, however, the first antenna 5 was inserted from the exterior 120 through the opening 7 into the interior 110. Both antennas 5, 6 are rod antennas and are arranged on the holder 11, each on one end of the holder 11. The holder 11 is inserted from the exterior 120 into the opening 7 and held in the opening 7 in a self-fixing manner. It is a screw with an external thread that is screwed into the opening 7 that has an internal thread. The holder 11 has a central, continuous hole as a holder opening 12 and the passive-galvanic coupling 13 runs through the holder opening 12. The passive-galvanic coupling 13 is electrically insulated from the holder 11.

Here, an easy-to-assemble passive repeater 100 that can be mounted, in particular, from one side, is provided. In addition, due to the few components, economical production is possible. Furthermore, the passive repeater 100 can be easily retrofitted if desired.

FIG. 3 shows a bicycle 16 with a passive repeater according to the invention based on the passive repeater from FIG. 2. The passive repeater 100 is fixed in an opening 7 of a frame tube 14, here seat tube, acting as a housing 3. The first device 1 with radio interface, here a switch actuator, is arranged in the interior 110 of the frame tube 14 and the second device 10 with radio interface is arranged on the handlebar 15 of the bicycle in the exterior 120. The opening 7 in which the passive repeater 100 is mounted is in the upper half of the seat tube and directed forward toward the handlebars 15 of the bicycle.

This arrangement can eliminate wiring that is guided from inside the tube to the outside.

With this invention, a device is presented in which, through a direct electrical connection of two antennas, a passive repeater is assembled. Here, one antenna is located inside the housing and creates the connection to the radio module shielded in the housing. The second antenna is connected electrically to the first and is located outside of the housing. This second antenna creates the connection to the radio module, e.g., the man-machine interface. Both antennas are fixed, e.g., to a screw and can be easily and economically screwed into a hole in the housing. For this purpose, e.g., in the embodiment of the bicycle frame, already existing holes, e.g., for fastening a drinking bottle, can also be used. This is thus an economical, easily retrofitted solution that requires no cable connection to the participating radio modules.

LIST OF REFERENCE NUMBERS

1 First device with radio interface
2 Antenna of first device
3 Radio barrier
4 Radio path in the interior
5 First antenna
6 Second antenna
7 Opening
8 Radio path in exterior
9 Antenna of second device
10 Second device with radio interface
11 Holder
12 Holder opening
13 Passive galvanic coupling
14 Frame tube of the bicycle
15 Bicycle handlebar
16 Bicycle
100 Passive repeater for forwarding radio signals
110 Interior
120 Exterior

The invention claimed is:

1. A passive repeater for forwarding radio signals from a first device with a radio interface to a second device with a radio interface, wherein the passive repeater is designed to forward the radio signals between an interior of a housing that has a housing wall acting as a radio barrier and an exterior through the housing wall, the passive repeater comprises a first antenna and a second antenna which are connected to each other by a passive and galvanic coupling, the first antenna is arrangeable in the interior and the second antenna is arrangeable in the exterior and the passive and galvanic coupling is realized through an opening in the housing wall, wherein the first antenna is insertable from the exterior through the opening into the interior or the second antenna is led out from the interior through the opening to the exterior, and one of the antennas or both of the antennas are formed from an elastic material and are configured to move from (a) a folded configuration during insertion through the opening to (b) an unfolded configuration after insertion through the opening.

2. The passive repeater according to claim 1, wherein the antennas and the passive and galvanic coupling are formed from a common, continuous electrically conductive component or from a common, continuous strand.

3. The passive repeater according to claim 1, wherein the passive repeater has a holder and the two antennas are arranged on the holder.

4. The passive repeater according to claim 3, wherein both of the antennas are preassembled on the holder.

5. The passive repeater according to claim 3, wherein the holder is inserted into the opening coming from one direction, that is, either from the interior or from the exterior.

6. The passive repeater according to claim 3, wherein the holder is held in a self-fixing manner in the opening.

7. The passive repeater according to claim 3, wherein the holder has a holder opening and the passive and galvanic coupling runs through the holder opening.

8. A radio system with a first device with a radio interface and a second device with a radio interface, the radio system comprising a passive repeater, and the first device with the radio interface and the second device with the radio interface exchange data via the passive repeater, the passive repeater is designed to forward the radio signals between an interior of a housing that has a housing wall acting as a radio barrier and an exterior through the housing wall, the passive repeater comprises a first antenna and a second antenna which are connected to each other by a passive and galvanic coupling, the first antenna is arrangeable in the interior and the second antenna is arrangeable in the exterior and the passive and galvanic coupling is realized through an opening in the housing wall, wherein the first antenna is insertable from the exterior through the opening into the interior or the second antenna is led out from the interior through the opening to the exterior, and one of the antennas or both of the antennas are formed from an elastic material, wherein the housing is a vehicle component and the first antenna is arranged in the interior of the vehicle component and the second antenna is arranged in the exterior, and the passive and galvanic coupling is realized through the opening which is located in a vehicle component wall, wherein the vehicle is a bicycle, the vehicle component is a frame tube of the bicycle, and the opening of the vehicle component wall is an opening in a wall of the frame tube, and the first device with the radio interface is arranged in the frame tube of the bicycle and the passive repeater is inserted into the opening.

9. The radio system according to claim 8, wherein the frame tube is the seat tube of the bicycle and the opening in which the passive repeater is at least one of inserted in an upper half of the seat tube or is directed forward toward a handlebar of the bicycle.

10. The radio system according to claim 8, wherein the first device with radio interface is a switch actuator or a control unit for an electrical bicycle drive motor.

11. A passive repeater for forwarding radio signals from a first device with a radio interface to a second device with a radio interface, wherein the passive repeater is designed to forward the radio signals between an interior of a housing that has a housing wall acting as a radio barrier and an exterior through the housing wall, the passive repeater comprises a first antenna and a second antenna which are connected to each other by a passive and galvanic coupling, the first antenna is arrangeable in the interior and the second antenna is arrangeable in the exterior and the passive and galvanic coupling is realized through an opening in the housing wall, wherein the first antenna is insertable from the exterior through the opening into the interior or the second antenna is led out from the interior through the opening to the exterior, and one of the antennas or both of the antennas are formed from an elastic material, wherein the housing is a bearing housing and the first antenna is arranged in the interior of the bearing housing and the second antenna is arranged in the exterior and the passive and galvanic coupling is realized through the opening that is located in a bearing housing wall.

* * * * *